Aug. 30, 1966     W. W. LOZIER ETAL     3,270,239
SOLAR SIMULATION APPARATUS
Filed Sept. 20, 1963
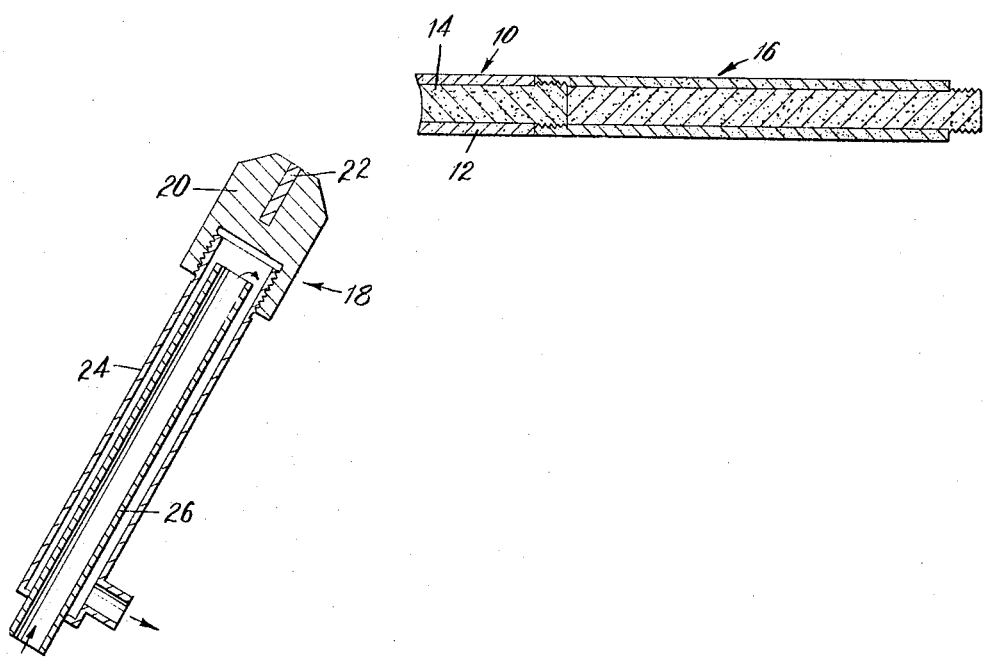
INVENTORS
WILLIAM W. LOZIER
MYRON R. NULL
RICHARD C. ESCHENBACH
BY *Robt C. Cummings*
ATTORNEY

United States Patent Office 3,270,239
Patented August 30, 1966

3,270,239
SOLAR SIMULATION APPARATUS
William W. Lozier, Rocky River, and Myron R. Null, Berea, Ohio, and Richard C. Eschenbach, Indianapolis, Ind., assignors to Union Carbide Corporation, a corporation of New York
Filed Sept. 20, 1963, Ser. No. 310,338
4 Claims. (Cl. 314—45)

The invention concerns an arc lamp suitable for simulating solar radiation.

Several arc lamps are known which simulate solar radiation with a reasonably good degree of accuracy. The best of these is a lamp employing two carbon electrodes in arcing relationship, the positive carbon containing flame materials such as the oxides and fluorides of rare earth metals. The arc produced between such electrodes closely simulates the solar spectrum outside the earth's atmosphere. Incandescent tungsten lamps, mercury lamps, and mercury-xenon lamps have also been employed for solar simulation, but the radiation produced by each of these lamps does not simulate the solar spectrum as closely as the arc carbon lamp mentioned previously.

Since solar simulation is usually involved in the testing of complex and expensive equipment intended for use in space flights, an extremely high standard of performance is demanded. Besides exhibiting a spectrum closely resembling that of the sun, a simulation lamp should be able to produce the proper intensity of radiation (about 130 watts per square foot at earth), to produce radiation collimated in a manner similar to that of the sun (collimated radiation within a cone of semi-apex angle of about 0.25 degree at earth), and to produce radiation at a constant value for a time sufficient to satisfy the requirements of space tests (possibly up to a month or more). The above arc sources when used in conjunction with suitable auxiliary equipment are able to produce collimated radiation of proper intensity reasonably well, but they are not capable of prolonged operation at constant radiation, at least at the present state of development.

For example, xenon and mercury-xenon lamps usually burn out within 500 hours. Lamps employing two carbon electrodes in arcing relationship, on the other hand, can operate indefinitely since carbon electrodes can be joined end-to-end and fed into the arc continuously. The joints between joined electrodes, however, tend to create arc disturbances during the period in which the joint is in the arc. This effect is not particularly a problem with the positive carbon electrodes since the burning rate of positive carbons is sufficient to hold this period to almost an instant, but the slower burning rate of negative arc carbons permits a noticeable effect because of the longer period in which the joint is in the arc. Improved means of joining the negative carbon electrodes, such as interlocking joints and cements, will probably solve the problem, but at the present time no completely effective means has been developed.

The primary object of the invention, therefore, is to provide a novel arc lamp which is suitable for simulating solar radiation.

There is shown in the drawing a sectional view of two electrodes in arcing relationship in accordance with the invention.

Broadly, the above object is achieved by the provision of an arc lamp which comprises a carbon electrode containing a flame material in arcing relationship with a nonconsumable electrode comprising a body having high heat conductivity and embedded in the body an insert of an electron-emitting material. This particular arc lamp is capable of operation for extended periods of time since the carbon electrode may be joined end-to-end with other carbon electrodes to form an "endless" electrode length which may be fed into the arc by suitable apparatus, and since the nonconsumable electrode is almost stable and lasts for long periods of time before failure.

The drawing illustrates the electrodes employed in the arc lamp of the invention. As there shown, the carbon electrode 10 comprises a shell 12 principally composed of a carbonaceous material, such as carbon or graphite, and a core 14 therein comprising a flame material bonded with a carbonaceous material. The carbon electrode 10 is joined to a second carbon electrode 16 in an end-to-end relationship by any suitable means, such as mating threads, bonding agents, and the like. Thus, a carbon electrode can be fed into the arc continuously merely by attaching another electrode onto the preceding electrode as it burns. Suitable apparatus for feeding the carbon electrode into the arc are known in the art.

The carbon electrode 10 is disposed in arcing relationship with a nonconsumable electrode 18 which comprises a body 20 made of a material of high heat conductivity, such as copper, silver, aluminum, brass, molybdenum, tungsten, columbium, tantalum and steel as well as alloys containing major amounts of at least one of the materials, and embedded in the body 20 an insert 22 of an electron-emitting material or a material which forms an electron-emitting material upon reaction with a gas surrounding the nonconsumable electrode. In general, the electron-emitting material must emit electrons more easily than the material of the body 20 at arc temperature. The electron-emitting material may be thoria, zirconia, ceria, yttria, tantalum oxide, magnesium oxide, lanthanum oxide, gadolinium oxide, calcium oxide, barium oxide, strontium oxide, samarium oxide, and mixtures thereof, particularly a mixture of strontium oxide and calcium oxide, as well as a mixture of barium oxide and strontium oxide. Many other electron-emitting materials may also be employed, such as zirconium nitride and zirconium carbide. Furthermore, the electron-emitting material may be formed in place by making the insert 22 of a material which upon reaction with the ambient atmosphere yields an electron-emitting material. For example, the metals thorium, zirconium, strontium and lanthanum, which are preferred metals for use as the insert 22, will form their oxides in the presence of air or other oxygen-yielding gases, and their nitrides in the presence of nitrogen. In this regard, the ambient atmosphere should be controlled to prevent undesirable reactions of the insert material with the ambient atmosphere.

Since the life of the nonconsumable electrode 18 principally depends upon the ability to dissipate heat from the insert 22, the nonconsumable electrode 18 is preferably constructed to be fluid-cooled. As shown in the drawing the nonconsumable electrode 18 is attached to a tube 24 by screw threads, which tube in turn contains within it another tube 26 which conveys a fluid, preferably water, to the back side of the body 20 having high heat conductivity. The fluid is then returned away from the body 20 inside the tube 24 where its exits from the system. Thus, the electron-emitting material of the insert 22 is maintained at a temperature as cool as possible to ensure long life. The tubes 24 and 26 are preferably made of copper, but other materials such as brass, aluminum, steel, and the like may also be employed.

The life of the insert 22 may be improved by incorporating in the insert material small amounts of a material of high heat conductivity, such as silver, as long as this material does not interfere unduly with the electron emission.

Electrical connections and equipment necessary to operate the arc lamp of the invention are known to those in the art, and thus are not shown in the drawing or described herein.

The carbon electrode 10 may be made by first mixing carbonaceous material with suitable binders, extruding the mix in the form of a shell, and baking the shell in accordance with conventional procedures. The core 14 must contain a predominant amount of carbonaceous material and flame material in order to obtain a light which has a spectrum similar to that of the sun. As used herein, the term "flame material" refers to those materials which become highly luminescent under the action of electrons in an arc. The flame material is preferably oxides or fluorides of rare earth metals such as cerium, but may also be a material such as thorium, iron, nickel, cobalt, manganese, strontium, calcium, and vanadium. Compounds other than oxides and fluorides of the rare earth metals may also be employed, and such techniques are known in the art. A core 14 may be easily made by extruding the core mix, baking the mix, and then inserting the baked core with a suitable binder therearound into the baked shell to form the final high intensity carbon electrode.

The nonconsumable electrode 18 may be made by providing a body of high heat conductivity and having a small hole drilled therein suitable for accepting the insert 22, and then inserting the insert 22 into the small hole. Preferably, the insert 22 is forced into the hole in a manner which provides good heat conductivity between the insert 22 and the body 20. The nonconsumable electrode 18 is currently used commercially under the name "insert electrode," although it has never been employed for the purposes described herein.

The above-described arc lamp is very useful for simulating solar radiation, since it may be operated continuously for long periods of time and since it provides a spectrum similar to that of the sun. The following example illustrates the advantages gained by the invention more fully.

An insert cathode, which consisted of zirconium wire brazed in a silver body, was installed in an arc lamp along with a positive carbon electrode. Both the insert cathode and the positive carbon were obtained commercially. The insert cathode was cooled by a high pressure water system arranged as shown in the drawing, and the insert cathode was carefully positioned in relation to the negative carbon to ensure that the arc would be struck only on the zirconium wire. The electrodes were maintained in an atmosphere of air. After the arc was struck the insert cathode was positioned to obtain arc voltage at a specified current. Thereafter, the arc gap remained the same by controlled feeding of the positive carbon by conventional apparatus.

The arc lamp was operated at an arc voltage of from 72 to 74 volts at 160 amperes with an arc gap of ⅞ inch. Cooling water pressure was 250 pounds per square inch gauge and the heat removed by the cooling water was 0.5 kilowatt. The arc lamp produced a light suitable for solar simulation and was operated for eight hours without a substantial discontinuity in the spectrum.

The invention provides an arc lamp which is suitable for simulating solar radiation, although the arc lamp of the invention may be used for other purposes, such as crystal growing by means of an arc image furnace, motion picture projection, and the like.

As used herein the term "nonconsumable electrode" refers to a relatively stable electrode which in general is composed of one or more metals or metal compounds, at least in predominant amounts, and which operates over longer periods of time than electrodes which burn, such as carbon electrodes.

What is claimed is:

1. An arc lamp suitable for simulating solar radiation, said arc lamp comprising in arcing relationship a positive carbon electrode and a negative nonconsumable electrode comprising a body having a high heat conductivity and imbedded in said body an insert of at least one material of the class consisting of zirconium, thorium, lanthanum, and strontium, said nonconsumable electrode being surrounded by an oxygen-yielding gas thereby causing the exposed portion of said insert to oxidize under the action of an arc to form an electron-emitting material thereon.

2. The arc lamp defined in claim 1 wherein said body is composed of silver, and said insert is composed of zirconium.

3. The arc lamp defined in claim 1 wherein said positive carbon electrode comprises a shell and a core therein containing a flame material selected from the group consisting of thorium, iron, nickel, cobalt, manganese, strontium, calcium, vanadium, and the oxides and fluorides of the rare earth metals.

4. The arc lamp defined in claim 1 wherein said body is composed of at least one of the materials selected from the group consisting of copper, silver, aluminum, brass, molybdenum, tungsten, columbium, tantalum, and steel.

References Cited by the Examiner
UNITED STATES PATENTS

| | | | |
|---|---|---|---|
| 447,702 | 3/1891 | Seibold | 313—311 X |
| 641,958 | 1/1900 | Heidel | 313—311 |
| 1,357,827 | 11/1920 | Sperry | 314—45 X |
| 3,086,103 | 4/1963 | Hackman et al. | 219—145 X |

RICHARD M. WOOD, *Primary Examiner.*

JOSEPH V. TRUHE, *Examiner.*